US012704859B1

(12) United States Patent
Hu et al.

(10) Patent No.: US 12,704,859 B1
(45) Date of Patent: Aug. 11, 2026

(54) METHOD FOR OPTIMIZED AUTONOMOUS DRONE SWARM PATH PLANNING

(71) Applicant: Jimei Univisity, Xiamen (CN)

(72) Inventors: Yendo Hu, San Diego, CA (US); Yiliang Wu, Xiamen (CN); Weican Chen, Xiamen (CN); Haichen Li, Qingdao (CN)

(73) Assignee: Jimei Univisity, Xiamen (CN)

( * ) Notice: Subject to any disclaimer, the term of this patent is extended or adjusted under 35 U.S.C. 154(b) by 0 days.

(21) Appl. No.: 19/546,578

(22) Filed: Feb. 23, 2026

(51) Int. Cl.
*G05D 1/693* (2024.01)
*G05D 1/644* (2024.01)
*G05D 109/25* (2024.01)

(52) U.S. Cl.
CPC ............ *G05D 1/693* (2024.01); *G05D 1/644* (2024.01); *G05D 2109/254* (2024.01)

(58) Field of Classification Search
CPC .............................. G05D 1/693; G05D 1/644
See application file for complete search history.

(56) References Cited

U.S. PATENT DOCUMENTS

2022/0103246 A1* 3/2022 Chai .................. H04B 7/18504
2023/0267843 A1* 8/2023 Permiakov ............... G08G 5/56
701/120
2025/0224730 A1* 7/2025 Rahman .................. G05D 1/46

* cited by examiner

*Primary Examiner* — Luke Huynh
(74) *Attorney, Agent, or Firm* — MEAGHER EMANUEL LAKS GOLDBERG & LIAO, LLP

(57) ABSTRACT

Methods and systems for unmaned aerial vehicles (UAV) swarm path planning based on potential field optimization. The method incorporates considerations of inter-UAV interaction forces, a collision risk calculation mechanism based on safe distance angles, and an auxiliary target point strategy. The system calculates collision risk by linearly dividing the safe distance angle between the UAV and obstacles. When the risk exceeds a threshold, the system generates two auxiliary sub-target points and selects the point closest to the flight start point as the optimal sub-target, guiding the UAV to avoid obstacles by applying auxiliary gravity. When the risk is below the threshold, the UAV is unaffected by repulsive forces. Therefore, frequency of heading angle changes of the drone in a swarm drone group is reduced based on the collision risk value comparisons.

1 Claim, 5 Drawing Sheets

500

METHOD FOR OPTIMIZED AUTONOMOUS DRONE SWARM PATH PLANNING

TECHNICAL FIELD

Present disclosure relates in general to the field of autonomous control technology for unmaned aerial vehicles (UAVs), and more specifically, to systems and methods for path planning and obstacle avoidance for drone swarms, particularly using an improved artificial potential field processing and auxiliary sub-target points to optimize path length and reduce number of heading angle abrupt changes. The disclosure may be used for. e.g., miniature mobile or aero platforms, such as micro unmanned aerial vehicles. As used herein, a vehicle is a movable apparatus or transporter which may be land, sea or aero based, and may be, e.g., a plane, train, automobile, boats, robot, drone, and more.

BACKGROUND

Drone swarms are groups of multiple, often small, unmanned aerial vehicles (UAVs) that work cooperatively and autonomously. The drones share data and coordinate actions to achieve a common path or goal, mimicking natural swarms like birds or insects. Drone swarms have application in e.g., emergency, entertainment, and etc., for tasks like surveillance, mapping, or light shows. Drone swarms offers more complexity, efficiency and robustness beyond what a single drone can accomplish.

SUMMARY

Accordingly, a drone swarm control system is described, comprising: a sensor united configured to detect the positions of environmental obstacles and neighboring drones; one or more processors configured to execute instructions to: output a collision risk value based on a safe distance angle; and a path decision module configured to perform control based on the collision risk value; wherein, when the collision risk value exceeds a preset threshold, an auxiliary sub-target point closest to the flight starting point is generated and an auxiliary gravitational force is applied; wherein, when the collision risk value is lower than the preset threshold, the repulsive force generated by the obstacle is shielded or zeroed out.

A method for unmaned vehicle swarm path planning is also described, wherein the method is executed by a vehicle with one or more processors, the method comprising: acquiring state information of the drone and its environmental obstacles; calculating a respective collision risk value based on a safe distance angle between the drone and each of the environmental obstacles; comparing each of the respective collision risk values with a preset safety threshold; in response to the each of the collision risk value exceeding the preset safety threshold: determining an optimal auxiliary sub-target point; and applying an auxiliary gravitational force to the drone pointing towards the optimal auxiliary sub-target point to guide the drone to avoid obstacles along a tangential path; in response to the each of the collision risk value being below the preset safety threshold: configuring the drone to ignore a repulsive force effect from the environmental obstacles; wherein frequency of heading angle changes of the drone is reduced based on the collision risk value comparisons; wherein the environmental obstacles comprise one or neighboring drones in a drone swarm group in which the drone belongs to; wherein the calculating the collision risk value further comprising normalizing the safe distance angle based on a preset linear division rule, such that the collision risk value varies linearly within the range of 0 to 1; wherein the determining the optimal auxiliary sub-target point further comprises: constructing a perpendicular line based on a connection between a current position of the drone and a position of an environmental obstacle; determining two intersection points of the perpendicular line with a potential field boundary of the environmental obstacle as candidate auxiliary sub-target points; calculating distances from two candidate auxiliary sub-target points to a flight start point of the drone; and selecting the candidate auxiliary sub-target point closest to the flight start point as the optimal auxiliary sub-target point.

DETAILED DESCRIPTION

Figure 1:
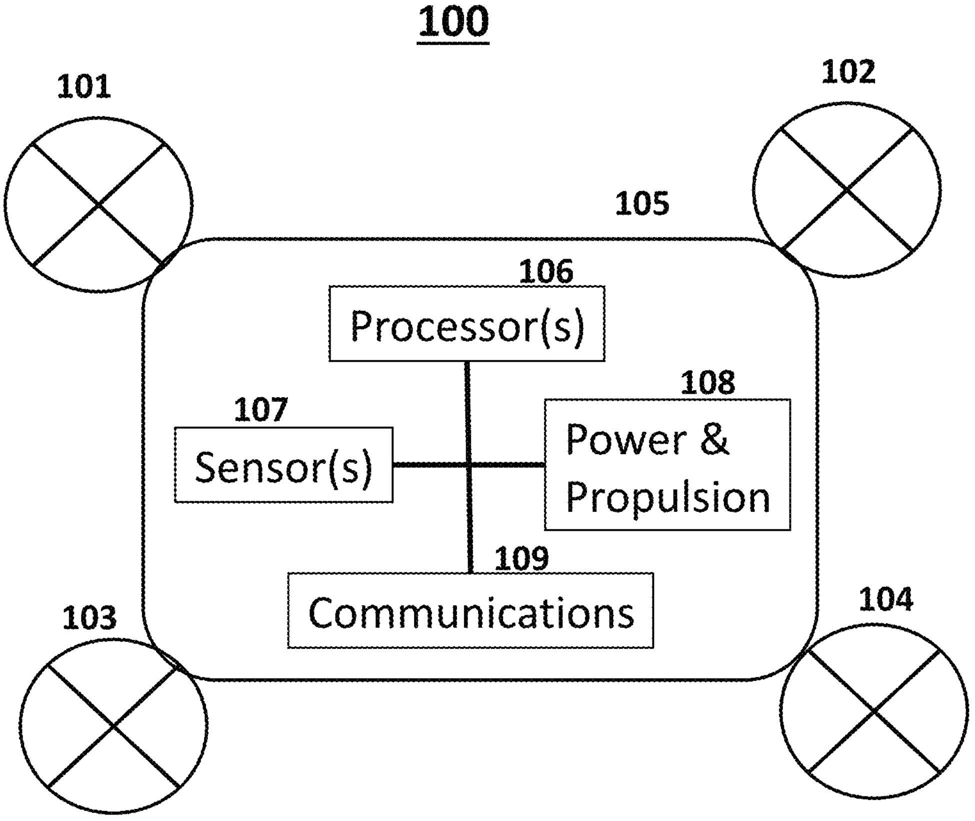
FIG. 1 illustrates a block diagram of an embodiment of an autonomous drone with which aspects of the present embodiments may be implemented.

Application scenarios of UAV swarms in complex environments are constantly expanding. Path planning and obstacle avoidance are core technologies for achieving autonomous operation. The Artificial Potential Field (APF) method, with its advantages of high computational efficiency and simple principles, has been widely used in UAV path planning. The Artificial Potential Field (APF) method is a widely used algorithm in robotics and autonomous systems for real-time local path planning and obstacle avoidance. It models the environment using attractive and repulsive forces to guide a robot to its goal while avoiding collisions. The APF algorithm is based on creating a virtual, artificial potential field within the robot's environment, consisting of two main components:

- Attractive Potential Field—A force is generated that pulls the robot toward the target destination. The potential energy is minimal at the goal and increases as the distance from the goal increases.
- Repulsive Potential Field—Obstacles in the environment generate a repulsive force that pushes the robot away. This potential is high near obstacles and diminishes to zero beyond a certain influence distance, ensuring the robot maintains a safe buffer.

The total force acting on the robot at any given point is the vector sum of all attractive and repulsive forces. The robot then moves in the direction of the negative gradient of this total potential field, effectively "rolling downhill" towards the lowest potential (the goal).

However, when the traditional APF method for a single robot is directly applied to multi-UAV swarm scenarios, significant technical bottlenecks still exist. First, relying solely on the repulsive force generated by obstacles during obstacle avoidance can easily lead to unreasonable obstacle avoidance path planning, causing unnecessary extension of the flight path and frequent abrupt changes in heading angle, increasing the difficulty of flight control and energy consumption; second, the potential field model of the traditional APF method couples the interaction forces between UAVs within the swarm, causing abnormal deviations in the planned paths of each UAV, ultimately further exacerbating the problem of unnecessary path extension in swarm scenarios.

To address the aforementioned problems, present disclosure provides improved cluster path planning methods based on potential field optimization for swarm scenarios.

According to one embodiment, present disclosure introduces a collision risk calculation mechanism based on a safe distance angle. Unlike traditional algorithms, present disclosure does not immediately apply a repulsive force upon detecting an obstacle. Instead, it first calculates a safe distance angle between the main UAV and the obstacle (or neighboring UAVs).

Based on this safe distance angle, present disclosure calculates a normalized collision risk value using a linear division rule. This risk value is used to determine an obstacle avoidance mode:

High-risk mode (guided mode): When the calculated collision risk exceeds a preset threshold, an embodiment according to the present disclosure activates an auxiliary sub-target generator. This generator generates two candidate auxiliary points at the obstacle's potential field boundary and selects the point closest to the main UAV's starting point as the optimal sub-target point. At this time, an embodiment according to the present disclosure applies an auxiliary attractive force, rather than a repulsive force, pointing towards this point to guide the UAV, thereby guiding it to smoothly avoid obstacles along a tangential path.

Low-risk mode (zero repulsive force mode): When the calculated collision risk is below a preset threshold, an embodiment according to the present disclosure determines that it is currently in a safe state, and the UAV will not be affected by the obstacle's repulsive force, thus avoiding unnecessary path deviation.

Accordingly, through the above exemplary mechanism or processing, the present disclosure effectively eliminates path jitter of the traditional APF typically used for a single vehicle, therefore significantly reduces the frequency of heading angle changes, and hence shortens the flight path length.

FIG. 1 illustrates an apparatus according to aspects of the present disclosure. A drone 100 for implementing aspects of the present disclosure is shown in FIG. 1. As an example, an autonomous drone 100 may comprises 4 propellers 101 to 104 on each corner of a drone body 105. Drone 100 may comprise four main illustrative components onboard the drone body 105: 1) a processing unit 106 comprising one or more processors, 2) a sensing unit comprising one or more sensors 107, 3) a power and propulsion unit 108, and 4) a communications unit 109.

Processing unit 106 is responsible executing low-level stabilization and executing flight software, as well as higher-level autonomy like obstacle avoidance or image processing, as to be described in detail below. For example, micro drones may use lightweight processors like an Orange Pi or Raspberry Pi Zero.

Sensing unit 107 may comprise inertial sensor(s) such as a 3-axis gyroscope and accelerometers to track the drone's orientation and stabilize flight. Sensing unit 107 may also comprise one or more optical flow sensors that uses ground texture to maintain position for indoor or GPS-denied environments. For outdoor uses, sensing unit 107 may comprise a GNSS/GPS unit. Additionally, sensing unit 107 may comprise ToF (Time-of-Flight) or LiDAR which is used for altitude hold and avoiding obstacles in tight spaces.

Additionally, as shown in FIG. 1, drone 100 comprises a power & propulsion unit 108 which may translate flight control signals from the processing unit 106 into precise electrical energy to drive motors thereon. The drive motors then power the propellers 101-104 to propel the drone 100. The power for the drone 100 may be provided, e.g., by one or more Lithium Polymer or Lithium Ion batteries that provides a high current required for flight.

Additionally, as shown in FIG. 1, drone 100 comprises a communications unit 109. The communications unit 109 provides telemetry/radio receiving and transmitting functions for linking the drone 100 to, e.g., a ground control station, a handheld transmitter or neighboring drones, for monitoring, emergency manual override, and/or drone swarming coordination.

Embodiments of the present disclosure may be implemented on a UAV onboard computing platform comprising one or more processors (e.g., 106 in FIG. 1), as described herein. Each UAV is equipped with one or more sensors (e.g., 107 in FIG. 1), configured to detect environmental obstacles and acquire flight state information (e.g., position, velocity, etc.) of the host UAV itself and neighboring UAVs.

Figure 2:
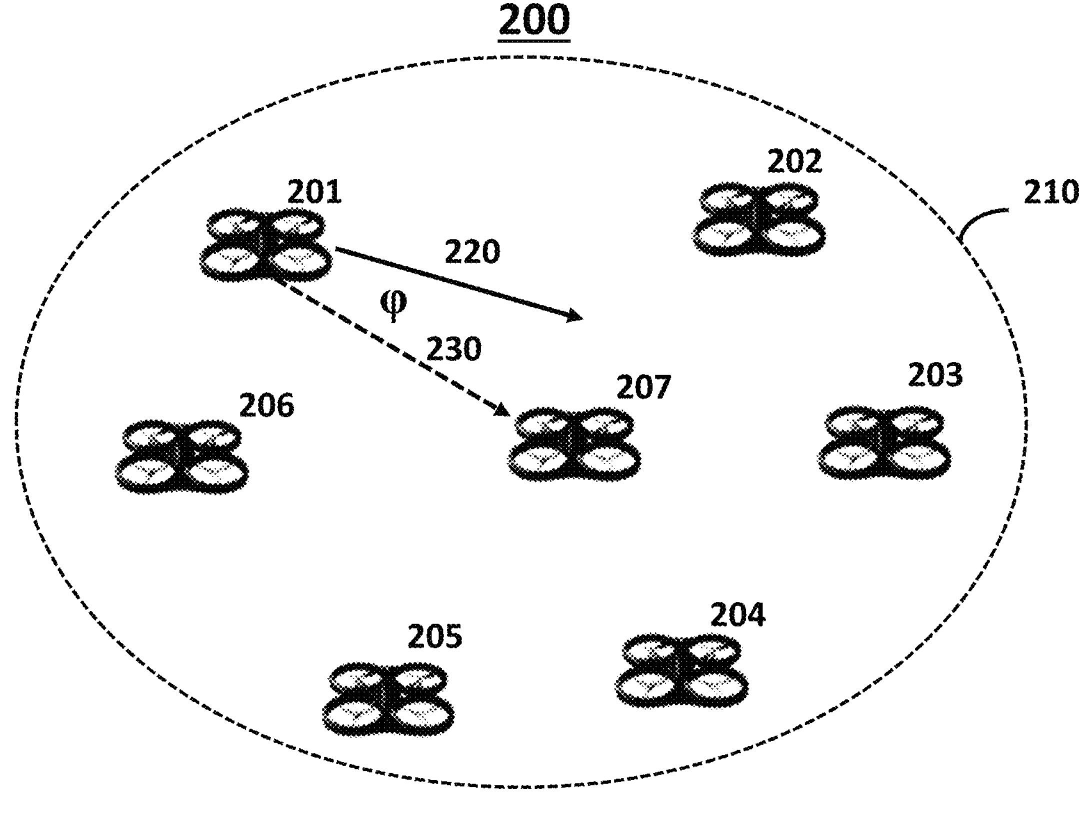
FIG. 2 illustrates an embodiment of an exemplary system with which aspects of the present embodiments may be implemented.

FIG. 2 illustrates an exemplary system 200 comprising multiple drones 201 to 207 in a swarm formation 210. As to be described in additional details herein, for a particular drone (e.g., 201) in a swamp group 210, an angle q is determined between a line 220 following the current directional vector of the host UAV (e.g., 201), and a line 230 from the current host UVA 201 to a potential environmental obstacle. A potential environmental obstacle may be one of the neighboring drones (e.g., 202, 204 or 205 in FIG. 2) to the current drone 201.

Figure 3:
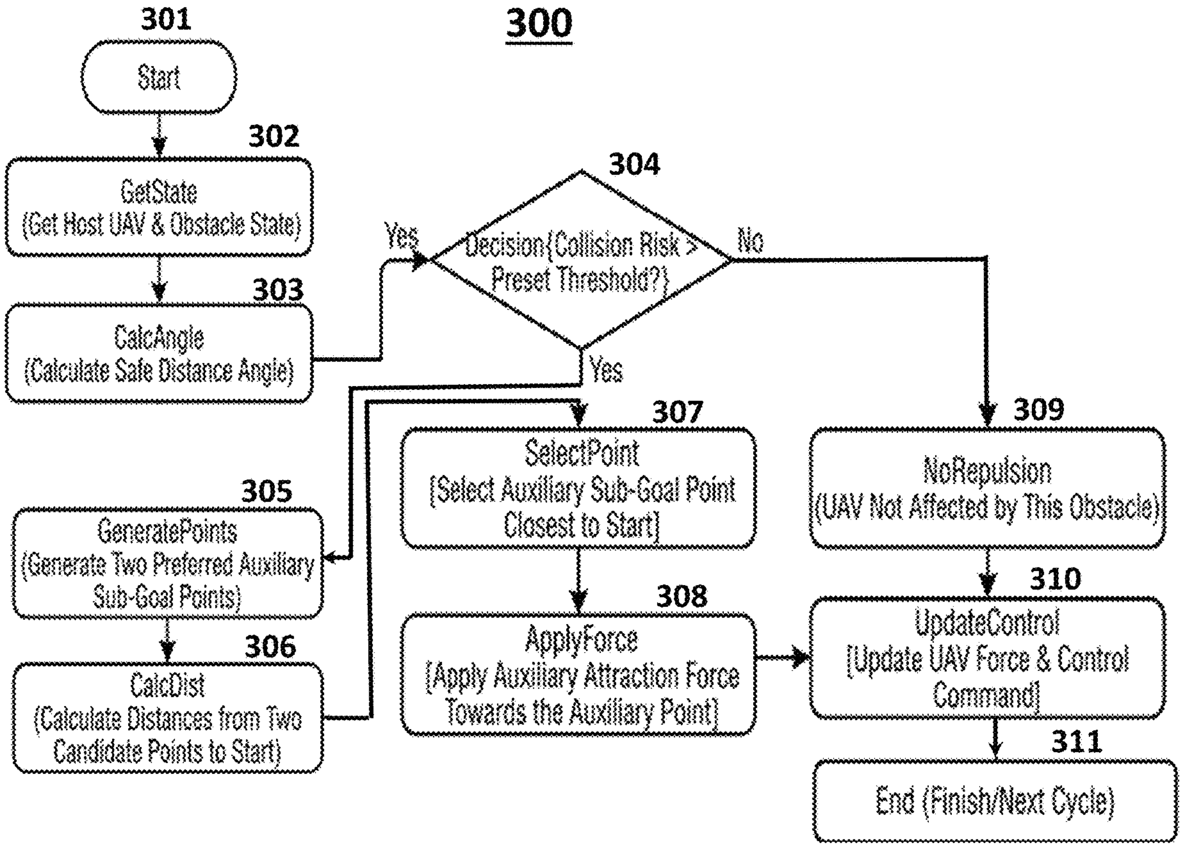
FIG. 3 illustrates an embodiment of a process for drone swarm path planning with which aspects of the present embodiments may be implemented.

FIG. 3 illustrates an embodiment of a process 300 for drone swarm path planning with which aspects of the present embodiments may be implemented. Process 300 starts at 301 of FIG. 3. The exemplary process 300 may be executed, e.g., by one or more processors of a primary UVA 201 (FIG. 2) in swarm group 210 (FIG. 2).

At 302. flight state information of the drone and its environmental obstacles are acquired. As described previously, flight state information may comprise, e.g., position, velocity, etc. of the host UAV, and the environmental obstacles may comprise any structure which may block the potential flight path of the host UAV, including neighboring UAVs in a swarm group.

At 303, a respective collision risk value based on a safe distance angle between the drone and each of the environmental obstacles is calculated. At 304, each of the respective collision risk values is compared with a preset safety threshold.

At 305 to 308, and 310 to 311, in response to the each of the collision risk value exceeding the preset safety threshold at comparison 304: At 305, two candidate auxiliary sub-target points are generated. At 305, distances from the two candidate auxiliary sub-target points to a flight start point of the drone are calculated. At 307, the candidate auxiliary sub-target point closest to the flight start point is selected as the optimal auxiliary sub-target point. At 308, an auxiliary gravitational force is applied to the drone pointing towards the optimal auxiliary sub-target point to guide the drone to avoid obstacles along a tangential path. At 310, UAV's force and control commands are updated accordingly to drive the propellers (e.g., 101-104 in FIG. 1). At 311, this cycle is finished and the next cycle is restarted at 301.

At 309-311, in response to the each of the collision risk value below the preset safety threshold at comparison 304: At 309, the drone is configured to ignore a repulsive force effect from the environmental obstacles. At 310, UAV's force and control commands are updated accordingly. At 311, the present cycle is also finished and the next cycle is restarted at 301. Based on the above described process 300, frequency of heading angle changes of the drone is reduced based on the collision risk value comparisons at 304 described herewith.

Other implementation details according to aspects of the present disclosure are further described below.

1. Definition of Potential Field Forces

The total control force $F_{total}$ typically consists of an attractive force $F_{att}$ directed towards a target and a repulsive force $$\sum_{i=1}^{n} F_{rep_i}$$

originating nom obstacles. However, in the present embodiment, a correction term based on inter-UAV interaction is introduced. Accordingly, the total control force is expressed as:

$$F_{total} = F_{att} + \sum_{i=1}^{n} F_{rep_i} + \sum_{i=1}^{m} F_{int}.$$

2. Collision Risk Calculation Model

Figure 4:
FIG. 4 illustrates an embodiment of a representative diagram illustrating a calculation of a safe distance angle and a linear division of a collision risk.
Figure 4:
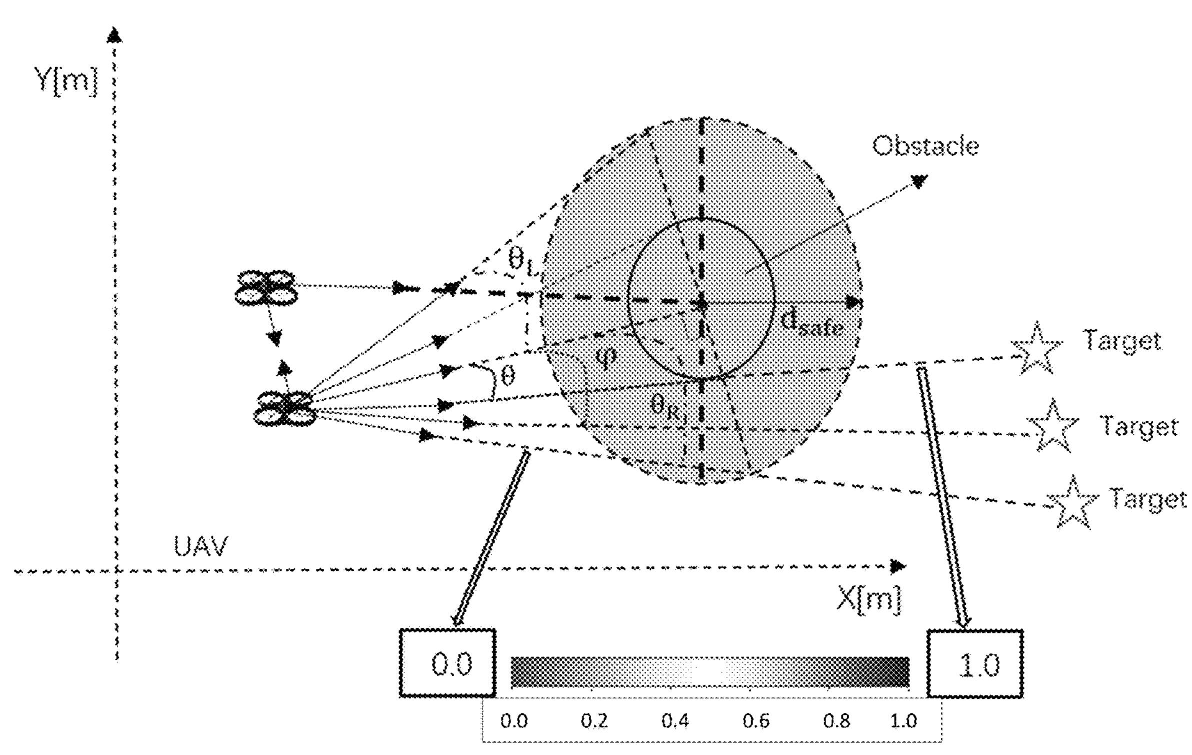

As illustrated in FIG. 2 and FIG. 4, the collision risk ($R_{col}$) is calculated as follows. The processor(s) first determines an angle φ between a line 220 following the current directional vector of the host UAV (e.g., 201 in FIG. 2) and a potential line 230 from the host UVA to a potential environmental obstacle. In a drone swarm scenario 200 shown in, e.g., FIG. 2, a potential environmental obstacle may be one of the neighboring drones (e.g., 202, 204 or 205 in FIG. 2) to a current drone 201.

One exemplary calculation model for $R_{col}$ based on the angle φ is illustrated in FIG. 4, and the calculation formulas describing the model 400 are provided below:

$$R_{col} = \begin{cases} 1.0 - \dfrac{\varphi - \theta}{\theta_L - \theta} & \theta < \varphi < \theta_L \\ 1.0 & \varphi < \theta \end{cases} \quad (1)$$

According to the above embodiment, for an angle φ smaller than a preset constant θ, it is considered high risk, $\theta_L$ thus $R_{col}$ is set to 1.0. For φ is greater than the preset constant θ, it follows a linear curve. $\theta_L$ is set to 180 degrees. With these settings, the formula $R_{col}$ above will address all possible q angles (+180 deg to −180 deg).

3. Auxiliary Sub-Target Point Generation Strategy

Figure 5:
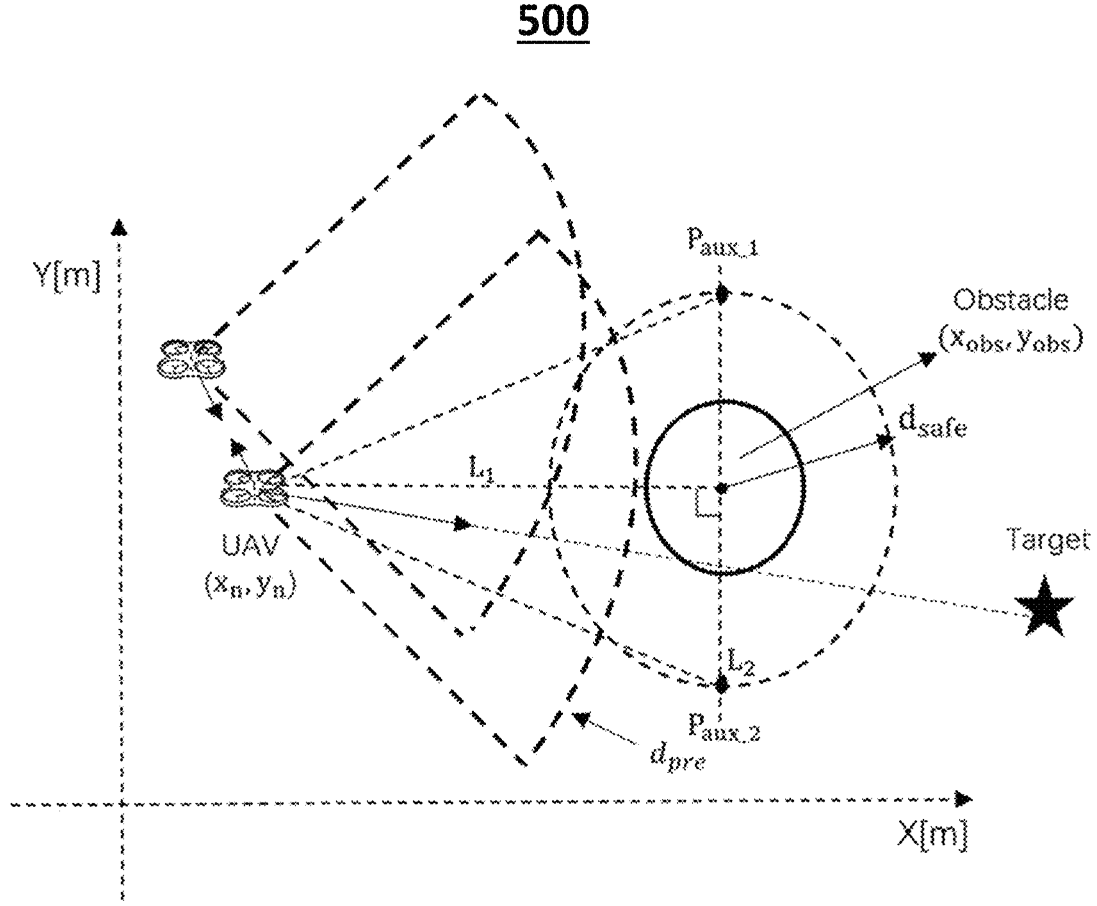
FIG. 5 illustrates an embodiment of a representative diagram illustrating generation of auxiliary sub-target points.

Referring to FIG. 5, an exemplary process 500 of an auxiliary sub-target generation strategy are as follows:

Step 1: Obstacle detection and risk assessment. Using the current position of the obstacle as the origin, the detection range is a 90° fan-shaped area in front (with a radius of $d_{pre}$). When an obstacle is detected, the calculated risk value is compared with the preset safety threshold.

Step 2: High-Risk State (Triggering Auxiliary Point). If the risk value $R_{col}$>the preset threshold, the system does not simply increase the repulsive force (which would cause oscillation), but instead activates the auxiliary sub-target generator.

Step 3: The logic for generating sub-targets using the auxiliary sub-target generator is as follows:

1. Perpendicular Projection: The algorithm draws a perpendicular line on the line connecting the current UAV position and the obstacle center (with a slope of $k_1$).

2. Intersection Determination: This perpendicular line intersects the potential field boundary defined by the obstacle at two points, defined as candidate points $P_{aux\_1}$ and $P_{aux\_2}$. The calculation formula is shown below:

$$x_{aux_i} = x_{obs} \pm \sqrt{\frac{d_{safe}^2}{1 + \left(\frac{-1}{k_1}\right)^2}} \; (i = 1, 2), \quad (2)$$

$$y_{aux_i} = y_{obs} \pm \sqrt{\frac{d_{safe}^2}{1 + \left(\frac{-1}{k_1}\right)^2}} \; (i = 1, 2), \quad (3)$$

3. Starting Point-Based Optimal Selection: The algorithm calculates the Euclidean distances from $P_{aux\_1}$ and $P_{aux\_2}$ to the drone's flight starting point.

Note: Choosing the point closest to the starting point prevents the drone from taking a longer obstacle avoidance route, ensuring the shortest total path.

4. Gravity Guidance: The selected point $P_{aux}$ generates an auxiliary gravitational force $$F_{aux_{att}}.$$

At this point, $$F_{total} = F_{aux_{att}} + \sum_{i=1}^{n} F_{rep_i} + \sum_{i=1}^{m} F_{int},$$

where $F_{int}$ is the inter-drone interaction force. The drone is attracted by $P_{aux}$, allowing it to bypass the obstacle area in a relatively smooth arc. This "attraction guidance" mechanism avoids the drastic force direction reversal common in traditional repulsive fields, thus reducing abrupt changes in heading angle.

4. Dynamic Repulsion Suppression

When the calculated collision risk $R_{col}$ is lower than a preset threshold ($R_{col}$<Threshold), this embodiment implements a "zero repulsion" control strategy. Specifically, when constructing the total control force for the UAV's flight, the processor actively forces the magnitude of the repulsion vector $$\sum_{i=1}^{n} F_{rep_i}$$

generated by the obstacle to zero, or removes the repulsion term from the resultant force superposition formula.

This means that when the UAV and the obstacle are at a relatively safe angle, the control algorithm shields the potential field interference from the obstacle, allowing the UAV to be driven only by the global target's gravity. This mechanism effectively prevents the UAV from deviating from its path due to unnecessary repulsion in the obstacle edge region, thereby effectively reducing the heading oscillation phenomenon commonly found in traditional Artificial Potential Field (APF) methods.

In one embodiment, the environmental obstacles may comprise one or neighboring drones in a drone swarm group in which the drone belongs to. In another non-limiting embodiment, the calculating the collision risk value comprises: normalizing the safe distance angle based on a preset linear division rule, such that the collision risk value varies linearly within the range of 0 to 1.

In yet another non-limiting embodiment, the determining an optimal auxiliary sub-target my comprise: constructing a perpendicular line based on a connection between a current position of the drone and a position of an environmental obstacle; and determining two intersection points of the perpendicular line with a potential field boundary of the environmental obstacle as candidate auxiliary sub-target points. In yet another non-limiting embodiment, wherein the determining an optimal auxiliary sub-target point further comprises: calculating distances from two candidate auxiliary sub-target points to a flight start point of the drone; and selecting the candidate auxiliary sub-target point closest to the flight start point as the optimal auxiliary sub-target point.

Accordingly, an exemplary method incorporates considerations of inter-UAV interaction forces, a collision risk calculation mechanism based on safe distance angles, and an auxiliary target point strategy. The system calculates collision risk by linearly dividing the safe distance angle between the UAV and obstacles. When the risk exceeds a threshold, the system generates two auxiliary sub-target points and selects the point closest to the flight start point as the optimal sub-target, guiding the UAV to avoid obstacles by applying auxiliary gravity. When the risk is below the threshold, the UAV is unaffected by repulsive forces. Therefore, frequency of heading angle changes of the drone in a swarm drone group is reduced based on the collision risk value comparisons.

The foregoing descriptions are merely exemplary embodiments of this disclosure and do not limit its scope. Any equivalent modifications or variations based on the teachings herein remain within the coverage of this disclosure. Those skilled in the art will readily conceive of other implementations after considering the specification and practical applications.

This application is intended to cover any adaptations or variations of the disclosure that adhere to its general principles, including common knowledge or conventional techniques in the field not explicitly documented herein. The specification and examples are to be regarded as illustrative, with the scope and spirit of the disclosure defined by the claims.

Furthermore, when a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software computer program, a data stream, or a signal. Even if only discussed in the context of a single form of implementation (for example, discussed only as a method), the implementation of features discussed can also be implemented in other forms (for example, an apparatus or a computer program executable by one or more processor). An apparatus, a device, a module, a component, and etc. can be implemented in, for example, appropriate hardware, software, and firmware, such as, e.g., a processor or the like. The methods can be implemented in, for example, a processor which refers to processing devices in general, including, for example, a computer, a microprocessor, an integrated circuit, or a programmable logic device. Processors also include communication devices, such as, for example, computers, cell phones, portable/personal digital assistants ("PDAs") or watches, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

The invention claimed is:

1. A method for a drone swarm path planning, wherein the method is executed by a vehicle with one or more processors, the method comprising:

acquiring state information of the drone and its environmental obstacles;

calculating a respective collision risk value based on a safe distance angle between the drone and each of the environmental obstacles;

comparing each of the respective collision risk values with a preset safety threshold;

in response to the each of the collision risk value exceeding the preset safety threshold:

determining an optimal auxiliary sub-target point; and applying an auxiliary gravitational force to the drone pointing towards the optimal auxiliary sub-target point to guide the drone to avoid obstacles along a tangential path;

in response to the each of the collision risk value being below the preset safety threshold:

configuring the drone to ignore a repulsive force effect from the environmental obstacles;

wherein frequency of heading angle changes of the drone is reduced based on the collision risk value comparisons;

wherein the environmental obstacle comprise one or neighboring drones in a drone swarm group in which the drone belongs to;

wherein the calculating the collision risk value further comprising normalizing the safe distance angle based on a preset linear division rule, such that the collision risk value varies linearly within the range of 0 to 1;

wherein the determining the optimal auxiliary sub-target point further comprises:

constructing a perpendicular line based on a connection between a current position of the drone and a position of an environmental obstacle;

determining two intersection points of the perpendicular line with a potential field boundary of the environmental obstacle as candidate auxiliary sub-target points;

calculating distances from two candidate auxiliary sub-target points to a flight start point of the drone; and selecting the candidate auxiliary sub-target point closest to the flight start point as the optimal auxiliary sub-target point.

* * * * *